Patented Sept. 21, 1948

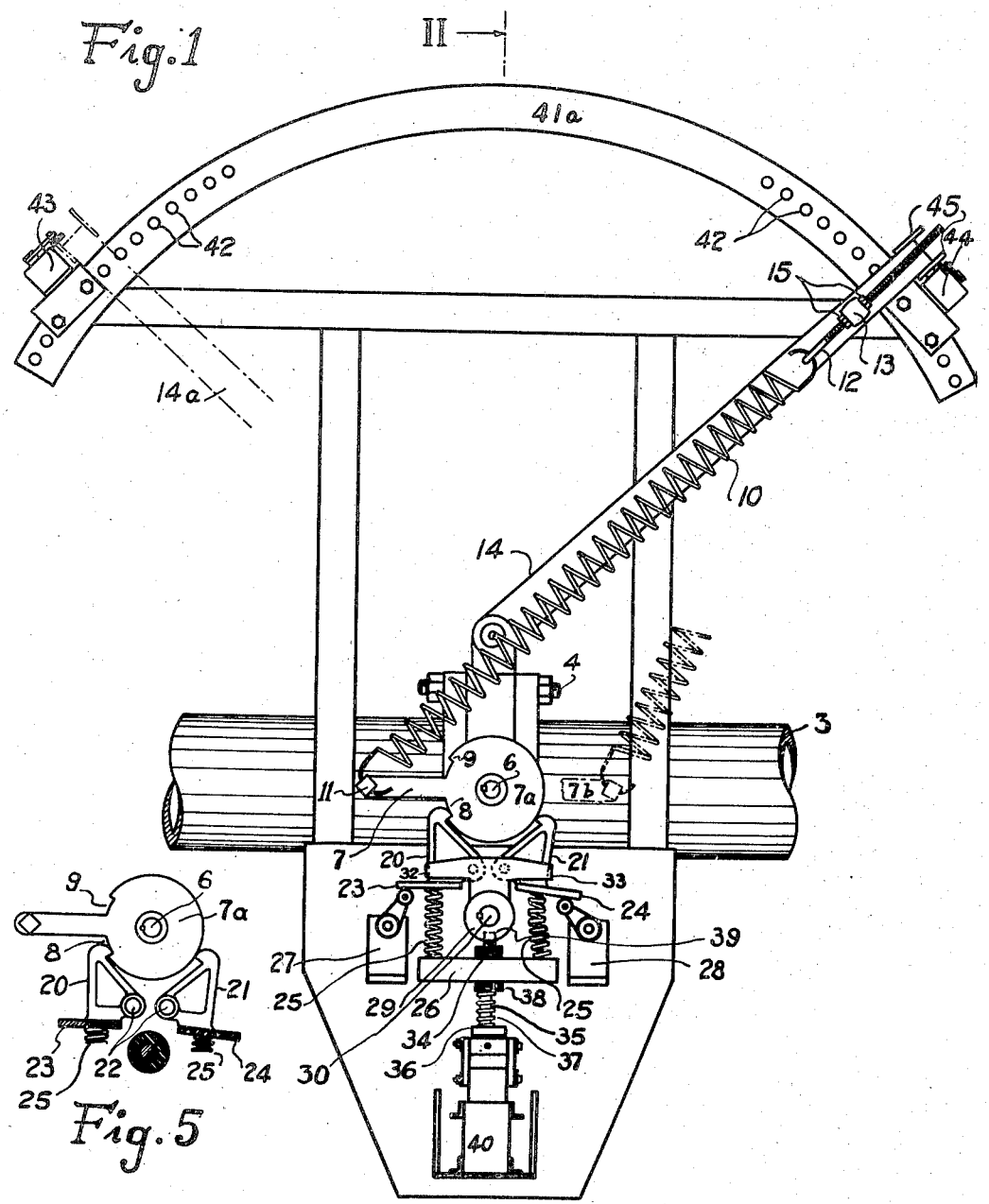

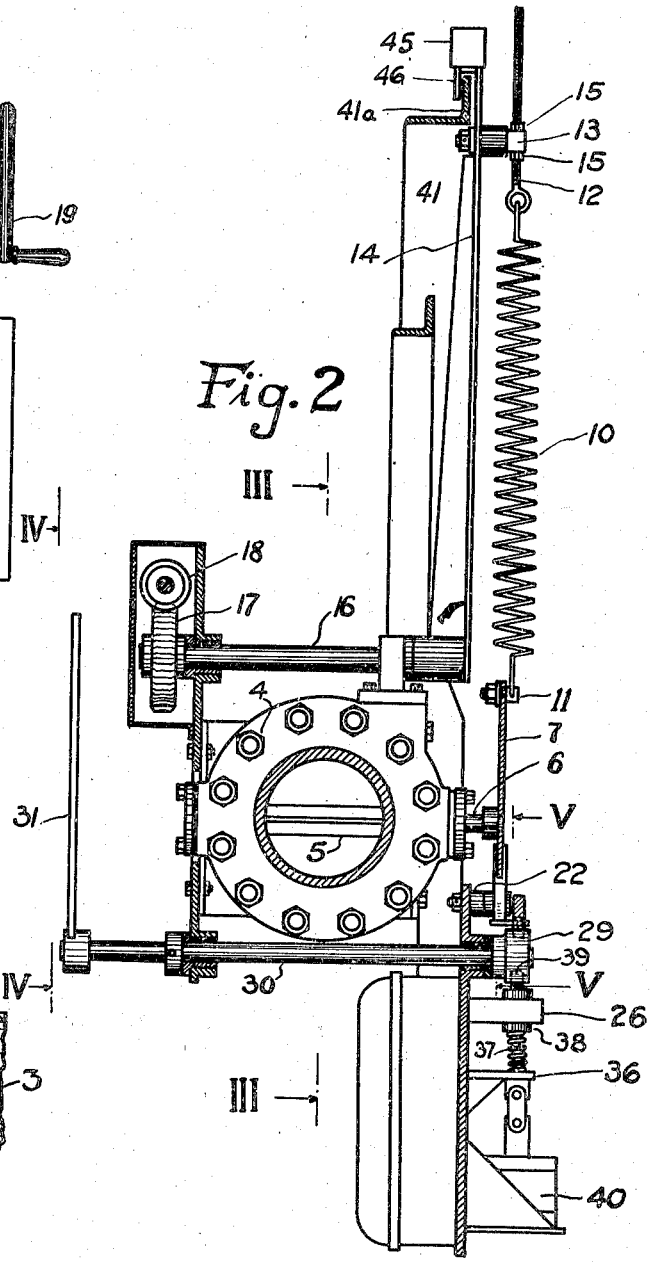

2,449,604

UNITED STATES PATENT OFFICE 2,449,604

QUICK-ACTING VALVE

James O. Jackson, Crafton, Pa., assignor to Pittsburgh-Des Moines Company, a corporation of Pennsylvania Application April 11, 1946, Serial No. 661,224

17 Claims. (Cl. 137—139)

This invention relates to quick acting valves and their actuating mechanisms.

In the quick acting valve art prior to this invention, it has been customary to cause a valve to open, or to open and close in a short interval of time by means of actuating mechanisms such as solenoids, springs, weights, levers, etc., and to cause such mechanisms to stop by means of bumpers, pressure cylinders, auxiliary springs or other shock absorbing devices.

While these prior mechanisms have been satisfactory for relatively slow moving valves or valves of relatively light mass or inertia, they have not been satisfactory for the actuation of valves having considerable mass or inertia, particularly when it is necessary to operate such valves quickly. For example, there has been no mechanism, so far as I am aware, capable of moving an eight inch valve from fully closed position to fully open position within a time interval such as one 25th of a second and then immediately moving such valve from fully open to fully closed position within a similar time interval. With prior devices, where sufficiently large forces have been employed to cause the valve to fully open within such a short time interval, the actuating mechanism has had such a large amount of inertia, that either some part thereof has been seriously damaged when stopped very quickly, or very elaborate or costly supplemental apparatus was necessary to dissipate the stored energy.

An object of this invention is to produce an improved quick acting valve and actuating mechanism therefor.

A further object is to produce a valve and valve actuating mechanism by means of which a valve having relatively great mass and inertia may be opened, or opened and closed, within a relatively short interval of time without shock to the actuating mechanism or the valve and without the use of complicated stop mechanism.

Another object is to produce mechanism for quickly opening a rotating disk valve in which the disk is of relatively great weight, and then quickly closing the same without shock to such mechanism.

A further object is to produce mechanism for actuating a rotating disk valve in which the means producing the actuating force is utilized in eliminating shock due to stopping rotation of the valve disk.

A still further and more limited object is to produce mechanism in which a spring is utilized as the source of power for quickly rotating the disk of a rotating disk valve, from fully closed to fully open position and then from fully open to fully closed position and in which such spring is also utilized to eliminate shock due to stopping rotation of the valve disk.

These and other objects which will be apparent to those skilled in this particular art, I attain by means of the device or apparatus described in the specification and illustrated in the drawings accompanying and forming part of this application.

In the drawings:

Figure 1 is a rear elevational view of a device or apparatus embodying this invention;

Fig. 2 is a view partially in section and partially in elevation and is taken on line II—II of Fig. 1, but with the valve in open position and the valve actuating mechanism in inoperative or intermediate position;

Fig. 3 is a longitudinal section of the valve body of the device and flanged pipes to which the body is bolted. This view illustrates the valve disk in fully closed position and is taken on line III—III of Fig. 2;

Fig. 4 is a front elevational view of a portion of the device looking toward the front or operator's side and can be said to be taken from line IV—IV of Fig. 2;

Fig. 5 is a detail view of a portion of the device taken on line V—V of Fig. 2.

Figure 6:
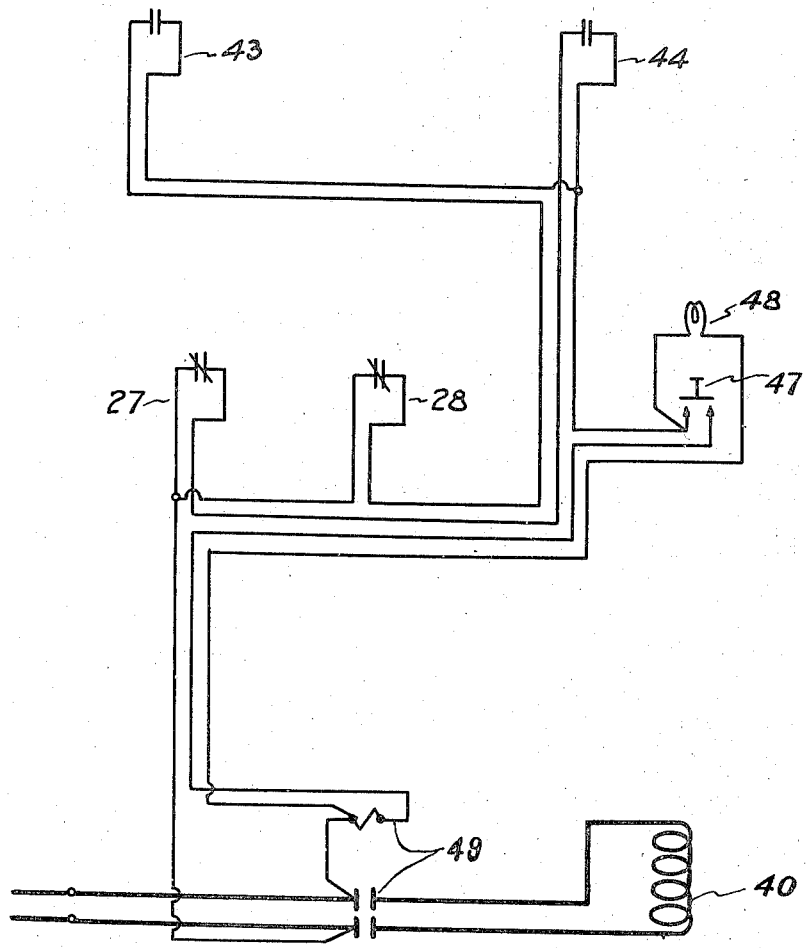
Fig. 6 is a schematic wiring diagram of the electrical circuit of the device.

In the device of the drawings, which has been chosen as one embodiment of this invention, a valve body 1 provided with a spherical seat 2 is inserted in a pipe line 3 as shown in Fig. 3. The valve body is located between the pipe flanges and is secured in position by a circular series of bolts 4. A valve disk 5 rigidly secured to a shaft 6 is provided with a spherical peripheral edge which is machined to fit the spherical valve seat with a minimum permissible clearance.

Shaft 6 is journaled for rotation within bearings in the valve body and has one end extended through and beyond the valve body. A valve operating lever arm 7 rigidly secured to shaft 6, is provided with a circular disk-like portion 7a, having opposed peripheral notches 8 and 9.

A tension spring 10, having one end connected to a rotatable crank pin 11 carried by lever arm 7 adjacent its outer end, has its opposite end secured to one end of an eye bolt 12 which passes through an opening in a support member 13 pivotally mounted on a pivoted spring tensioning arm 14.

Eye bolt 12 is threaded throughout the major part of its length and is held in adjusted position within support member 13 by means of adjusting nuts 15 threaded to the eye bolt on opposite sides of the support member.

The operating or rotational speed of valve disk 5 can be controlled in two ways, one by adjusting the tension of spring 10 by means of nuts 15 and the other by varying the amplitude of movement of spring tensioning arm 14. The dotted line position of lever arm 7, indicated by 7b, is the position said lever arm takes when valve disk 5 is in "off" position or has been rotated 180° from its closed or starting position. If valve disk 5 is in closed position when the parts are as indicated in Fig. 1 by full lines then it is again in closed position when operating lever 7 reaches the dotted line position indicated by 7b. Complete closing of the valve at the proper time is facilitated because of the width of the spherical seat in the valve body which permits of overtravel of lever 7, with the disk still in closed position.

When operating lever 7 is in dotted line position, the valve is fully closed and, in order to cause the valve to again quickly open and quickly close, it is only necessary to swing the spring tensioning arm 14 to dotted line position 14a and operate the valve release mechanism to be later referred to.

Spring tensioning arm 14 is rigidly connected to a rock shaft 16, and is swung from one spring tensioning position to the other by a gear set comprising a worm wheel 17, keyed to the outer end of shaft 16 and a worm 18 meshing with such wheel and which is rotated by a hand wheel 19. This hand wheel and gear set is utilized to stress spring 10 and place it in position to rotate the valve disk.

With the spring tensioning arm in the position shown by full lines in Fig. 1, lever arm 7, when released, will be moved clockwise by spring 10 and when in the position indicated by dotted lines 14a, lever arm 7, when again released, will be moved counterclockwise by spring 10.

Notch 8 in the peripheral edge of circular portion 7a of valve disk operating lever 7 is adapted to be engaged by pawl 20 as shown in Figs. 1 and 5, when the valve disk is in one stop position and notch 9 is adapted to be engaged by pawl 21 when the valve disk is in its other stop position and lever 7 is in dotted line position 7b.

Pawls 20 and 21 are each mounted on the reduced end of one of a pair of support studs 22 which project horizontally from the frame of the device, and each pawl is provided with a base portion which projects forwardly of the pawl body as disclosed in the drawings. The base for pawl 20 is numbered 23 while that for pawl 21 is numbered 24. Compression springs 25, one located between each such base portion and a support 26 secured to and projecting horizontally from the frame of the device, yieldingly hold the pawls in contact with the peripheral edge of circular portion 7a of lever 7. Bases 23 and 24 respectively contact with the operating arms of two limit switches 27 and 28.

A trigger device having a hub portion 29 keyed to a rock shaft 30 is manipulated to unlatch valve lever 7 by means of a hand lever 31 which is also keyed to the rock shaft. The trigger device is provided with oppositely extending arms 32 and 33 which respectively overlie bases 23 and 24 of pawls 20 and 21.

With the parts in the position shown in Fig. 1, in which pawl 20 is shown latching the valve disk in one of its stop positions, and with spring 10 biased toward its other stop position, the rocking of shaft 30 counterclockwise by hand lever 31 to depress base 23 against the stress of spring 25 will unlatch operating lever 7 and permit spring 10 to rotate the valve disk to its second stop position in which lever 7 occupies its dotted line position 7b and with pawl 21 engaging notch 9.

In order to prevent improper manipulation of hand lever 31, means is provided for normally locking such lever against movement and in vertical position as shown in Fig. 4. Support member 26 directly below the axis of rock shaft 30 is drilled to receive a bushing 34. A plunger rod 35 mounted for reciprocation within such bushing and an opening in a bracket 36 is yieldingly forced toward rock shaft 30 by means of a helical compression spring 37. This spring surrounds plunger rod 35 and is confined between bracket 36 and a collar 38 which is pinned to the plunger rod.

Hub portion 29 of the trigger device is provided with a socket for receiving the upper end of the plunger rod as disclosed by dotted lines at 39 in Figs. 1 and 2. Unlocking of the trigger device and therefore hand lever 31, is accomplished by means of a solenoid 40 which when energized, causes the plunger rod to be withdrawn from its socket within the hub of the trigger device.

A curved angle-shaped member 41 supported centrally above the valve device by means of a frame as shown in Fig. 1, has one leg 41a thereof extending vertically. Adjacent each end, leg 41a is provided with a series of spaced bolt holes 42. Limit switches 43 and 44, bolted in position within such bolt holes act as adjustable stops for determining the amplitude of movement of spring tensioning arm 14.

Arm 14 at its outer end is provided with a pair of limit switch contact members 45 and these contact members are provided with a steadying finger 46 which is spaced from arm 14 and extends behind leg 41a. The stop positions of spring tensioning arm 14, and therefore the amplitude of movement of such arm, are determined by the position of the adjustable stops; in this case, limit switches 43 and 44.

In the electrical power circuit disclosed in Fig. 6, limit switches 43 and 44 are operated by contact members 45 on spring tensioning arm 14, and limit switches 27 and 28 are operated by pawl bases 23 and 24. Limit switches 27 and 28 are normally open, while limit switches 43 and 44 are normally closed. The position of switches 43 and 44 is made adjustable to meet different operating conditions and to cause the valve disk to stop each time it is in closed position where it is locked by engagement of pawls 20 or 21, as the case may be, with notches 8 or 9 at the end of each cycle.

A push button 47 having an indicating light 48 is included in the electrical circuit and is adapted to be manually operated to energize solenoid 40 to withdraw plunger 39 and thus unlatch the trigger device. This allows the trigger device to be operated by hand lever 31 to start rotation of the valve disk in the direction opposite to that in which it was being rotated when last stopped.

Stopping of the valve disk is automatic, since pawls 20 and 21 ride on the circular peripheral edge of part 7a of lever 7 and one or the other of such pawls under the urge of its spring 25 drops into notch 8 or 9 as such notch registers with the pawl.

With the parts in the position shown in Figure 1, switches 44 and 27 are closed. If solenoid 40 is energized by operating push button 47 and the tripper is operated to release lever 7 (by depressing pawl 20) lever 7 will be moved to dotted line position 7b. Now, if lever 31 is recentered or moved to vertical position so that latch plunger 34 is re-engaged, switch 27 will be opened and switch 28 closed, since pawl 21 will drop into notch 9. Solenoid 40 cannot then be energized without moving spring tensioning lever 14 to dotted line position 14a so as to open switch 44 and close switch 43.

Having thus described my invention, what I claim as new and desire to secure by Letters Patent is:

1. In a quick acting valve device, a valve body, a valve disk mounted for rotation within such body and having a mounting shaft, one end of which extends through and beyond said body, a lever attached to such shaft end and extending at right angles to the axis of rotation of said disk, a member rotatable with said disk and having spaced pawl engaging notches defining two stop positions for said disk, spring actuated pawls for alternately engaging said notches to latch said disk in its two stop positions, a spring stressing agent movable to either side of a line perpendicular to the axis of rotation of said disk and intermediate its stop positions, a spring having one end operatively connected to said lever and the other end operatively connected to said pivoted agent, and a device for unlatching said notched member; the construction and arrangement being such that when the valve disk is latched in one stop position and said agent is moved to bias said spring toward the other stop position to stress the spring, and the valve disk is unlatched, said disk will be rotated to its second stop position and said spring, after passing its position of least stress, will again be stressed, and such stressing is utilized to eliminate shock due to stopping rotation of the valve disk.

2. A structure as defined in claim 1, in which the spring stressing agent takes the form of a pivoted arm having its pivot point adjacent the valve body.

3. A structure as defined in claim 1, in which the valve body is provided with a seat formed as a section of a hollow sphere.

4. A structure as defined in claim 1 in which the valve body is provided with a seat formed as a section of a hollow sphere and the peripheral edge of the valve disk is formed as a section of a solid sphere.

5. A structure as defined in claim 1, in which the valve disk operating spring is helical.

6. A structure as defined in claim 1, in which the tension of the valve disk operating spring is adjustable.

7. A structure as defined in claim 1, in which the tension of the valve disk operating spring can be varied by varying the amplitude of movement of the spring stressing agent.

8. A structure as defined in claim 1, in which the notched member is formed as part of the lever attached to the valve mounting shaft.

9. A structure as defined in claim 1, in which the valve is fully closed in both stop positions of the valve disk.

10. A structure as defined in claim 1, in which the device for unlatching the notched member is manually operable.

11. A structure as defined in claim 1, in which the device for unlatching the notched member is mounted on a manually rockable shaft.

12. A structure as defined in claim 1, in which the rotatable notched member is circular, the notches are located in its peripheral edge and the pawls bear against said edge.

13. A structure as defined in claim 1, in which the line to either side of which the spring stressing agent is movable is midway between the stop positions of the valve disk.

14. A structure as defined in claim 1, in which the valve disk operating spring is operatively connected to the spring stressing agent by a device employing an adjustable turnbuckle.

15. A structure as defined in claim 1, in which the device for unlatching the notched member is normally locked against movement.

16. A structure as defined in claim 1, in which the spring stressing agent takes the form of a pivoted arm having its pivot point above the valve body.

17. A structure as defined in claim 1, in which the spring stressing agent takes the form of a pivoted arm having its pivot point above the valve body and located in a plane common to the axes of rotation of the valve disk and said manually rockable shaft.

JAMES O. JACKSON.